3,034,927
MANUFACTURE OF SYNTHETIC LEATHER
John Holden Fairclough, Fairways, Culcheth, near Warrington, and Harold Jeffrey Atkins, Kinder, Culcheth, near Warrington, England, assignors to Lantor Limited, Manchester, England, a British company
No Drawing. Filed Apr. 14, 1959, Ser. No. 806,214
Claims priority, application Great Britain Apr. 16, 1958
16 Claims. (Cl. 117—140)

The present invention relates to the manufacture of synthetic leather and leather-like materials from non-woven webs of bonded fibres.

It is important that such materials should have a "grain" or smooth side and a "flesh" or fibrous side which is characteristic of real leather. According to one method which has been suggested for producing such materials two mats of fibres made by paper-making technique are plied and impregnated with a vinylidene polymeric resin, dried and subsequently hot pressed. The plied mats are then split at or near the middle to produce a leather-like material having a "grain" side and a "flesh" side. Splitting in this way necessitates special machinery such as leather splitting machinery. Splitting is also difficult to carry out accurately, particularly where thin leather-like materials are to be produced.

We have found that plying and splitting can be eliminated in producing leather-like materials which have a "grain" side and a "flesh" side and which are permeable to water-vapour if heat is applied only to one side of the web during pressing.

According to the present invention a method of manufacturing a leather-like material having a "grain" side and a "flesh" side is provided which comprises pressing a web of fibres, having a substantially random orientation and bonded together with a quantity of a polymeric thermoplastic fibre-bonding agent which softens at a temperature less than the temperature at which the fibres of the web soften, and simultaneously applying heat to one side only of the web sufficient to cause the bonding agent to soften only on that side so as to form a material which has a greater denstiy on that side than on the other and which retains the density difference when removed from the heat and pressure, the quantity of bonding agent being such that the web so formed contains not less than 40% and not more than 75% calculated on the total weight of the dry bonded web, of bonding agent.

The fibres of which the web is composed may be, for example, nylon, cotton, viscose rayon staple fibres, or any mixtures of these, but we prefer to use a web containing at least 65% of synthetic fibres, for example polyamide or polyester fibres. A suitable web is one in the manufacture of which an air tunnel has been used in the manner described in British patent specification No. 659,088.

As the bonding agent we may use any known to be suitable for the manufacture of non-woven, textile subsitute materials provided it has a softening point which is less than that of the fibres of which the web is composed and which preferably does not substantially soften below 85° C. Suitable bonding agents which may be used with most types of fibres are natural rubber, or vinylidene polymers or copolymers. It is important, however, that the bonding agent should in no way chemically damage the fibres during the process. Preferably the bonding agent is a copolymer of acrylonitrile and butadiene or a derivative thereof or contains at least 75% by weight of such copolymer or derivative thereof. Other bonding agents which may be used are copolymers such as butadiene/styrene, butadiene-1,3/acrylonitrile; vinyl chloride and vinylidene chloride copolymers, e.g. vinyl chloride/vinyl acetate, vinylidene chloride/vinyl acetate, vinyl chloride/vinyl acetate/acrylonitrile; or various vinylidene, hydrocarbon negatively substituted vinylidene copolymers, e.g. ethylene/vinyl chloride, butadiene/methyl methacrylate, butadiene/acrylonitrile, isoprene/acrylonitrile.

The web of non-woven bonded fibres may be prepared, for example, by impregnation of the web with a solution or dispersion of the bonding agent, or substance forming the bonding agent on drying, with or without a curing agent and drying the impregnated web. It is important however that, prior to the pressing and heating, the bonding agent should not be cured to the extent that in order to produce the desired effect the web must be heated to such a high temperature that the fibres may be damaged.

It is generally necessary to treat the web of fibres with the polymeric thermoplastic fibre-bonding agent more than once until the web contains the desired amount. Thus after the first impregnation and drying to bond the fibres together, the resin bonded non-woven web may be re-impregnated one or more times with the bonding agent, and dried after each impregnation. The same or different bonding agent from the one used for the first impregnation, may be used for the re-impregnation provided it has a softening point which is less than that of the fibres contained in the web.

In one form of the method previously referred to as having been proposed for manufacturing leather-like materials the web of plied mats non-woven fibres is impregnated with a resin bonding agent and is dried so as to induce the resin to migrate towards both surfaces of the web, which is then split so as to produce a material which is binder rich on one side and fibre rich on the other. We prefer to avoid migration of the bonding agent as much as possible during drying. This may be done for example by coagulating the solution of the bonding agent after impregnation of the web before drying, or by not using a dilute solution or dispersion of the bonding agent for impregnation, or by heating the impregnated web as far as possible uniformly throughout and avoiding conditions which cause greater evaporation on one side of the web than on the other.

We prefer to use separate drying and hot pressing steps in carrying out the process. The impregnated and dried web may be hot pressed between plates, one of which is unheated and the other of which is heated to a temperature sufficient to cause the resin to soften but insufficient to damage the fibres. Preferably the web is passed under pressure between a pair of rollers, one of which is heated and is preferably made of metal and the other of which is unheated. The conditions of heating and pressing should be such as to cause the bonding agent to soften on one side of the web without it softening on the other. The time of heating is preferably short, for example less than one minute and preferably less than 15 seconds, and both the temperature and pressure are inversely related to the time of heating. The temperature and pressure are inversely proportional. The pressure applied to the web is preferably at least 150 pounds per linear inch. The unheated roller may conveniently be of a softer material than metal, for example compressed cotton. Owing to the short time of heating and the high temperatures used for the heated roller and consequently the high rate of cooling, and also owing to the insulating effect of the web, the unheated roller remains relatively cool and the conditions of heating chosen should be such that the unheated roller does not reach a temperature at which it softens the bonding agent.

Simultaneously with hot pressing, or separately, the smooth "grain" side of the material may be embossed with a design to give its surface an appearance of real leather. Alternatively it may be passed through a sueding calender consisting of two or more bowls of which the one that is in contact with the "grain" side of the material has a surface having a high co-efficient of friction, for example a coating of emery powder, and is driven at a higher speed than that of the web. The finished material treated in this way has the characteristic appearance and feel of suede leather.

After hot pressing and either embossing or sueding the leather-like material may be sprayed with the usual leather finishing agents including pigment which is used on leather together with a suitable binder and subsequently dried.

The thickness of the material made according to this invention may be varied according to the purpose for which it is to be used and it may be moulded into shapes by heat and pressure.

The invention will be more clearly understood by reference to the following examples which are purely illustrative.

*Example 1*

A web of nylon fibres in which the fibres were arranged in a wholly random way and made by using an air tunnel as described in British patent specification No. 659,088 was impregnated with a 20% aqueous dispersion of a carboxylic butadiene/acrylonitrile copolymer (for example the product sold under the trade name Hycar No. 1571 by British Geon Ltd.). Excess dispersion was then removed by extraction so as to leave on the web 15% of copolymer calculated on the dry weight of the bonded web. The impregnated web was dried by blowing hot air at a high velocity through it. The dried web was then re-impregnated with a 40% dispersion of carboxylic butadiene/acrylonitrile copolymer and excess dispersion was removed by mangling so as to leave the required quantity of copolymer on the material. It was again dried by blowing hot air at a high velocity through the web.

The bonded fibre web made in this way weighed 9.5 ounces per square yard and contained 48% by weight of fibre and 52% by weight of bonding agent calculated on the total weight of the dry bonded web.

After drying the web was heated on one side and pressed by passing it between one metal roller heated to 154° C. and a compressed cotton roller which was unheated except by contact with the metal roller through the web. The unheated roller remained during the pressing operation at a temperature of about 40° C. The pressure between the two rollers was 250 pounds per linear inch and the time that the web in contact with the hot roller was about 0.3 seconds.

The finished material had an appearance similar to real leather, one side being smooth and the other fibrous. Strips cut from the material in all directions had a tensile breaking strength of 60 pounds per one inch width of strip when tested on a testing machine having a constant rate of extension of eighteen inches per minute, the distance between the jaws of the machine holding the strip being 7 inches at the start of the test. The tearing strength of the material was 4 pounds using the two-legged tongue tear test with a constant rate of extension of eighteen inches per minute. The material had a void space of approximately 52% and was permeable to water vapour.

*Example 2*

A non-woven fibre bonded web made as in Example 1 but from nylon and viscose rayon staple fibres in the proportion of 65% by weight of nylon and 35% by weight of viscose rayon was impregnated with a 20% aqueous dispersion of carboxylic butadiene/acrylonitrile copolymer, excess dispersion was removed and the web dried as described in Example 1 so that the web contained 15% of bonding agent calculated on the dry weight of the bonded web.

The web was then re-impregnated with an aqueous dispersion containing carboxylic butadiene/acrylonitrile copolymer and a latex made from polyvinyl chloride the solid content of the dispersion being in the proportions two thirds of the former to one third of the latter. Excess dispersion was removed by passing the web between the bowls of a mangle so as to leave the required quantity of binder on the material. It was again dried as described in Example 1.

The bonded fibre web weighed 9 ounces per square yard and contained 45% of bonding agent calculated on the total weight of the dry bonded web.

The web was then passed between a heated metal roller and a compressed cotton roller, the heated metal roller being heated to a temperature of 120° C. The pressure between the rollers was 500 pounds per linear inch and the web was in contact with the hot roller for a third of a second.

The finished material had the appearance of real leather and had similar physical properties to the material made in Example 1 but it also had thermoplastic properties. It could therefore be moulded into a shape.

*Example 3*

A web of nylon fibres made as in Example 1 was impregnated with an aqueous dispersion containing 15% of the copolymer used in Example 1. The excess copolymer was removed and the web was dried as described in Example 1 so that the dried material contained 12% by weight of bonding agent calculated on the dry weight of the bonded web.

The dried web was re-impregnated with an aqueous dispersion containing 41% of acrylonitrile/butadiene copolymer. It was lightly squeezed between mangle bowls to remove excess dispersion. It was then passed into an aqueous solution containing 20% by weight of calcium nitrate to cause coagulation of the acrylonitrile/butadiene copolymer dispersion. The web was then squeezed between the bowls of a mangle to remove excess calcium nitrate solution. It was then washed off in water to remove the calcium nitrate and was then dried on steam heated drums.

The bonded fibre web then contained 52% of bonding agent calculated on the total weight of the dry bonded web. It was then pressed and heated as in Example 1.

The finished material had properties similar to that made according to Example 2 but it was in addition more soft and more supple and the smooth surface of the material had less tendency to crease the crack then the finished material made according to Example 1.

*Example 4*

A bonded fibre web was made as in Example 1 and contained 15% of carboxylic butadiene/acrylonitrile bonding agent calculated on the dry weight of the bonded web after the first impregnation. It was then re-impregnated so as to contain 25% of the bonding agent and impregnated again so as to contain 65%. The dried web was heated and pressed as described in Example 1.

The web was then passed through a sueding calender, the fibrous side of the web passing in contact with a roller coated with emery powder and revolving at 1500 revolutions per minute.

The fibrous surface of the web was raised by this treatment so that the finished material had the appearance and handle of suede leather.

*Example 5*

A bonded web of nylon fibres was made as in Example 1 and contained 15% of carboxylic butadiene/acrylonitrile bonding agent calculated on the dry weight of the bonded web. The dried web was then impregnated with a dispersion of natural rubber latex containing 69% solid and also containing rubber curing agents. After removal of excess dispersion the web was dried by passing it over sixteen steam heated cylinders at a temperature of 110° C., both sides of the web coming into contact with the hot cylinders. The material being heated for a total time of 2 minutes. These conditions of heating and drying are adjusted to give the minimum of curing of the rubber prior to hot pressing. The bonded fibre web then contained 75% of bonding agent calculated on the total weight of the dry bonded web.

The web was then heated on one side and pressed by passing it through a two bowl calender, the top bowl being made of steel and heated to a temperature of 150° C. and the bottom bowl being made of compressed cotton. The web entered the calender passing over the top of the top bowl and then passed between it and the compressed cotton bowl. The pressure between the bowls was 250 pounds per linear inch. The time that the web was in contact with the hot bowl was 5 seconds.

The finished material was similar to that made according to Example 1 but it was rather stiffer and rather less permeable. It had less tendency to crease and crack than the finished material made according to Example 1.

We claim:

1. A method of manufacturing a leather-like material having a "grain" side and a "flesh" side which comprises pressing a substantially dry web of fibres, having a substantially random orientation and bonded together with a quantity of a polymeric thermoplastic fibre-bonding agent which softens at a temperature less than the temperature at which the fibres of the wet soften, and simultaneously applying heat to one side only of the web sufficient to cause the bonding agent to soften only on that side so as to form a material which has a greater density on that side than on the other and which retains the density difference when removed from the heat and pressure, the quantity of bonding agent being such that the web so formed contains not less than 40% and not more than 75% calculated on the total weight of the dry bonded web, of bonding agent.

2. A method as claimed in claim 1 in which the bonding agent does not substantially soften at a temperature below 85° C.

3. A method as claimed in claim 1 in which the web contains at least 65% of synthetic fibres.

4. A method as claimed in claim 3 in which the synthetic fibres are selected from the group consisting of the polyamide and polyester fibres.

5. A method as claimed in claim 1 in which the bonding agent is selected from the group consisting of natural rubber and vinylidene polymers.

6. A method as claimed in claim 1 in which the bonding agent is selected from the group consisting of copolymers of acrylonitrile and butadiene and derivatives thereof.

7. A method as claimed in claim 1 in which the bonding agent contains at least 75% by weight of a member selected from the group consisting of copolymers of acrylonitrile and butadiene and derivatives thereof.

8. A method as claimed in claim 1 in which the steps of drying and pressing while simultaneously applying heat are separate.

9. A method as claimed in claim 1 in which the step of pressing and simultaneously applying heat is effected by passing the web under pressure between a pair of rollers one of which is heated and the other being unheated.

10. A method as claimed in claim 9 in which the heated roller is made of metal.

11. A method as claimed in claim 9 in which the unheated roller is made of a softer material than the heated roller.

12. A method as claimed in claim 1 in which the time of heating in the step of pressing and simultaneously applying heat is less than one minute.

13. A method as claimed in claim 1 in which the time of heating is less than 15 seconds.

14. A method as claimed in claim 1 in which the pressure applied to the web in the step of pressing and simultaneously applying heat is at least 150 pounds per linear inch.

15. A method of manufacturing a leather-like material having a "grain" side and a "flesh" side which comprises impregnating a web of non-woven fibres having a substantially random orientation with a dispersion of a thermoplastic fibre-bonding agent which softens at a temperature less than the temperature at which the fibres of the web soften, drying the impregnated web, pressing the dried web and simultaneously applying heat to one side only of the web sufficient to cause the bonding agent to soften only on that side so as to form a material which has a greater density on that side than on the other and which retains the density difference when removed from the heat and pressure, the quantity of bonding agent being such that the web so formed contains not less than 40% and not more than 75%, calculated on the total weight of the dry bonded web, of bonding agent.

16. A method of manufacturing a leather-like material having a "grain" side and a "flesh" side which comprises impregnating a web of non-woven fibres having a substantially random orientation with a dispersion of a thermoplastic fibre-bonding agent which softens at a temperature less than the temperature at which the fibres of the web soften, drying the impregnated web, repeating the step of impregnation and drying until the web contains the desired amount of bonding agent, pressing the dried web and simultaneously applying heat sufficient to cause the bonding agent to soften only on that side so as to form a material which has a greater density on that side than on the other and which retains the density difference when removed from the heat and pressure, the quantity of bonding agent being such that the web so formed contains not less than 40% and not more than 75%, calculated on the total weight of the dry bonded web, of bonding agent.

References Cited in the file of this patent

UNITED STATES PATENTS

| | | |
|---|---|---|
| 2,064,360 | Schur | Dec. 15, 1936 |
| 2,715,588 | Graham et al. | Aug. 16, 1955 |